United States Patent Office 3,703,385
Patented Nov. 21, 1972

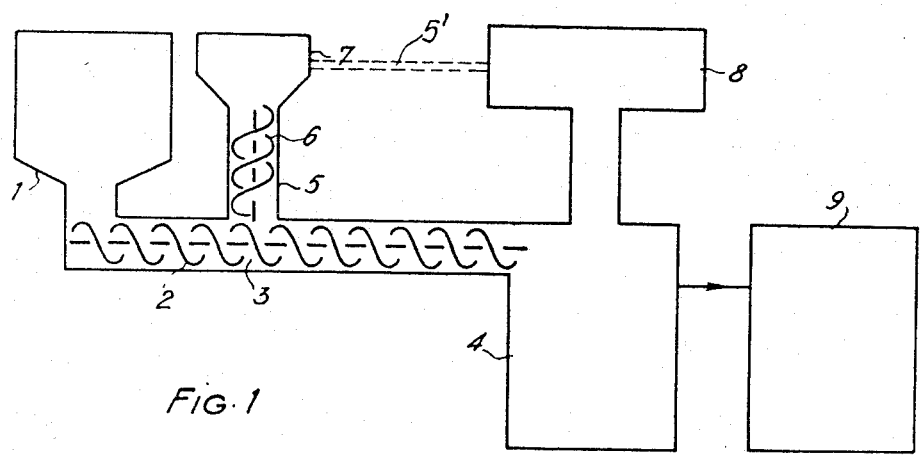
Fig. 1
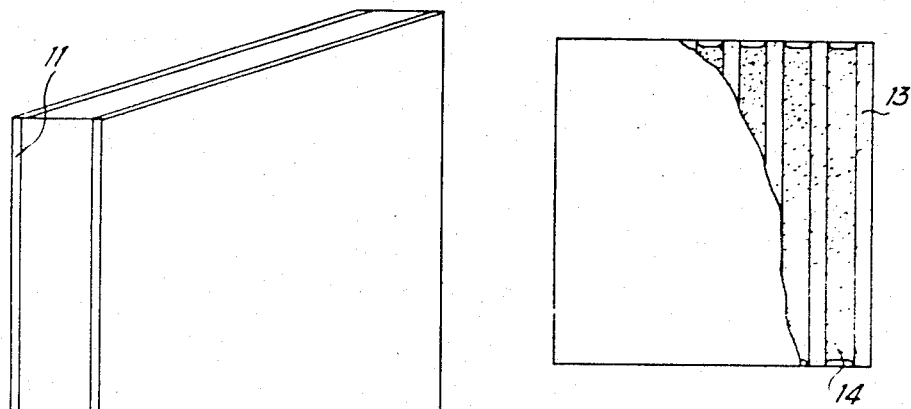
Fig. 2
Fig. 3
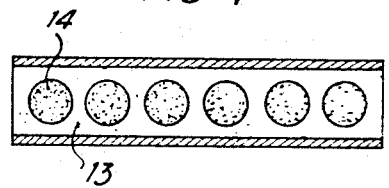
Fig. 4

3,703,385
FIRE-RESISTANT PRODUCTS AND PROCESS OF MAKING THE SAME
Charles Emile Zwickert, 108 Bis Rue Jean Jaures, Noisy-le-Sec, France
Filed Dec. 23, 1969, Ser. No. 887,674
Claims priority, application France, Sept. 25, 1969, 6932783
Int. Cl. C09k 3/28
U.S. Cl. 106—15          2 Claims

ABSTRACT OF THE DISCLOSURE

The invention relates to the fire resistance of solid products which are produced from fluid materials, namely liquid or pasty materials as well as solid materials in divided condition. In order to obtain a product having improved fire resistance properties, said fluid material is mixed with loose ashes. Particulate panels and plastic material are important examples of solid products to which the invention may be applied.

---

This invention relates to the fire resistance of solid products which are produced from fluid materials. In the present specification, "fluid materials" is intended to mean liquid or pasty materials as well as solid material in finely divided condition.

It is a main object of the invention to provide structural elements, such as particulate panels, made of particles bonded together by means of a suitable glue or adhesive, having improved fire resistance properties.

It is also an important object of the invention to provide products manufactured from resins such as plastic materials, particularly molded plastic materials and cellular plastic material with closed or open cells, having improved fire resistance properties. Elastomer products are particularly useful.

According to the invention, a solid product having improved fire resistant properties is formed by mixing a fluid material with loose ashes. Loose ashes as used herein refers to residue resulting from fine particles carried by the fumes of heat engine stations or other stations burning coal, and collected before escaping.

The loose ashes either are mixed directly with the fluid material or are mixed with an agent used for the transformation of this material in the solid product, the mixture of this agent and the loose ashes being there after mixed with the fluid material. Thus, when the product comprises particulate panels, loose ashes are mixed with the particles, which may comprise chips of wood or other vegetable materials for example. Alternatively, the ashes can be mixed with the glue used for agglomerating the chips, with the mixture of glue and loose ashes being then mixed with the chips.

Loose ashes may be used in mixture, preferably in dry mixture, with other agents, particularly chemical agents such as mineral salts. For example, it is advantageous in many instances to use loose ashes in mixture with borax, preferably in dry mixture with powdered borax.

When the solid product is a plastic material, manufactured from a resin, loose ashes are mixed with the resin or are mixed with an agent used for transforming this resin, the mixture thus obtained being then mixed with the resin.

It is to be pointed out that loose ashes are by far less expensive than other usual fire-resistance agents such as asbestos or mica. Moreover, loose ashes are obtained in extremely fine powder condition, which makes their mixing very easy. Preferably, loose ashes are used in dry powder condition, but in some cases it is advantageous to have the ashes dispersed in a solvent or some other chemical product.

The proportion of loose ashes in the mixture with the fluid material is variable to a large extent. For a panel made from agglomerated particles, good performances are obtained with a volume of loose ashes within the range of 2–50%, preferably 5–25%, of the volume of particles, for instance.

Further objects and advantages of the invention will become more readily apparent from the following description and the annexed drawings.

In the drawings:
FIG. 1 is a diagrammatic view of an apparatus for the manufacture of an agglomerated panel processed according to the invention;
FIG. 2 is a perspective view of a panel obtained according to the invention, and
FIGS. 3 and 4 are vertical and horizontal sections respectively, across another panel obtained according to the invention.

In FIG. 1, which is also illustrative of the process according to the invention, wood chips or other chip material produced in a mill 1 are transported, by a screw 2 for example, disposed in a conduit 3 leading to a mixer 4 to which is also supplied glue transported from a tank 8.

Loose ashes from a tank 7 are introduced into conduit 3 through a conduit 5 wherein the ashes are transported under the action of a screw 6 or other transporting means. The chips, loose ashes and glue are mixed together in the mixer 4 and the mixture is sent thereafter to a press 9, of conventional construction and operation.

Experiments show that not only the mixing of chips with loose ashes is very easy but also that it makes easier the transport of the chips along the conduit and the working of the chips, which is unexpected.

In another embodiment of the invention, illustrated in broken lines in FIG. 1, loose ashes are sent through a pneumatic transporting line 5' to the glue tank 8 wherein they are mixed with the glue, prior to delivery to the mixer 4. Loose ashes may be mixed as well with a component of the glue.

The adhesives used in these manufactures may be varied in composition. As an example, a particulate board was formed, comprising 20 kg./m.$^2$ of wood chips agglomerated with an ureaformaldehyde resin glue (sold under the trademark "Kaurit"), with the glue comprising 5 to 8% by weight of the weight of chips. Loose ashes were added in the proportion of 10 to 20% by weight relative to the weight of the glue.

Such a board, when exposed to the flame of a blowtorch, shows excellent dimensional stabiilty (no deformation) and a remarkable resistance to fire; as soon as the flame is suppressed the board ceases to glow and is not consumed. It is also to be noted that the board remains stable with humidity, with no swelling being apparent.

Loose ashes may be used in a humidified powder condition if the presence of water is not detrimental to the binding agent.

FIG. 2 is a perspective view of a board obtained according the invention which comprises a core 10 manufactured by pressure from a mixture of, for example, wood chips with loose ashes either alone or in mixture with another agent, for example, borax and/or bicarbonate of soda. Decorative panels 11 and 12 are glued to the core. In another embodiment, the core 10 is made from a mixture of resins with loose ashes.

FIGS. 3 and 4 illustrate a board of the so-called tubular type, namely a board the core 13 of which is provided with a number of tubular cavities 14. According to the invention, these cavities are filled with a dry pulverulant mixture comprising loose ashes and a stabilizing agent, namely, any agent able to stabilize the powdered mixture in the form of a solid mass when exposed to a flame. Borax is a known stabilizing agent well suited to be mixed with loose ashes. Excellent results are obtained with a proportion of borax or similar agent below 20% by weight of the total weight of the mixture and preferably within the range 5 to 10%.

These mixtures containing a major proportion of loose ashes are relatively lightweight, their weights being in the range 60 g./l. (when not compressed) to 90 g./l. (when compressed). With a view to obtaining better sound insulation it is possible to incorporate in the filling some sound-insulating agent such as sand. The invention thus provides panels wherein loose ashes are a fire-insulating agent and a sound-insulating agent.

These panels are cheaper than similar conventional panels since a significant part of the chip material is replaced by loose ashes.

A typical board manufactured according to the invention is a board wherein the width of core material 13 between tubular compartments 14 and between the compartments 14 and the decorative panels 11 and 12 is about 5 mm., the compartments being filled with 20 to 23 litres of loose ashes per square meter of board, and the chips being mixed with 5 to 25% of loose ashes by volume.

While I have chosen to illustrate my invention by showing and describing some preferred embodiments of it, I have done so by way of example only, as there are many modifications and adaptations which can be made by one skilled in the art within the teaching of the invention.

I claim:

1. A solid building product having improved fire resistant properties wherein said building product is formed with a plurality of cavities extending therethrough, said cavities being filled with a pulverulent mixture of loose ash and borax, said ash being from a coal burning station and said borax being present in an amount below 20% by weight of the total weight of the mixture.

2. The product of claim 1 wherein said proportion of said borax is within the range of 5 to 10% by weight of the total weight of the pulverulent mixture.

References Cited
UNITED STATES PATENTS

| | | | |
|---|---|---|---|
| 2,001,311 | 5/1935 | Omansky | 260—39 R |
| 2,849,316 | 8/1958 | Lauring | 162—159 |
| 3,025,159 | 3/1962 | Brouillette | 260—17.3 |
| 2,691,598 | 10/1954 | Meurice | 106—40 |
| 2,684,958 | 7/1954 | Stilbert | 260—17.3 |
| 2,634,207 | 4/1953 | Miscall | 162—181 |
| 3,455,850 | 7/1969 | Saunders | 260—2.5 AK |

OTHER REFERENCES

Chem. Abstract, vol. 34:5963 [8] (1939).
Chem. Abstract, 47:1977b (1953).

THEODORE MORRIS, Primary Examiner

U.S. Cl. X.R.

106—137, 286; 260—39 R; 161—403